M. A. MARCUCCI.
INSECT BEATER.
APPLICATION FILED APR. 15, 1916.
1,190,440.
Patented July 11, 1916.
2 SHEETS—SHEET 2.
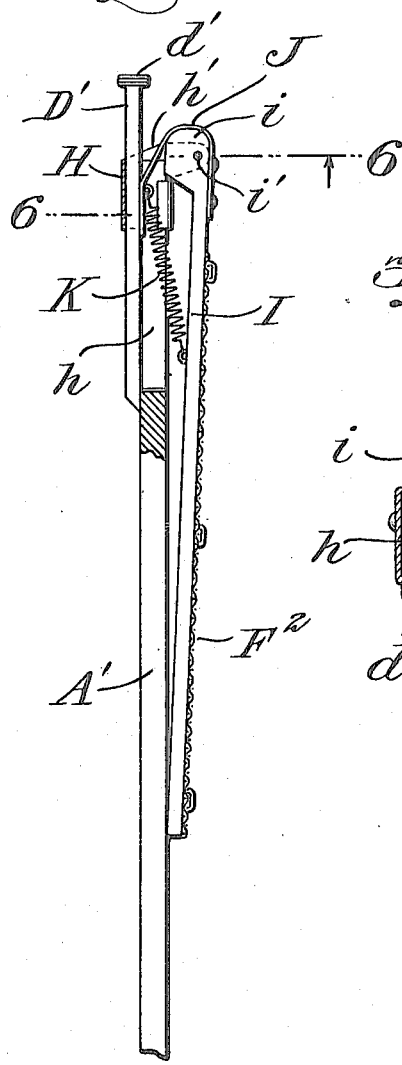
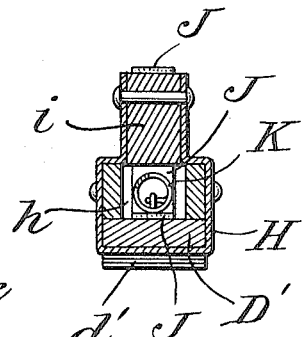
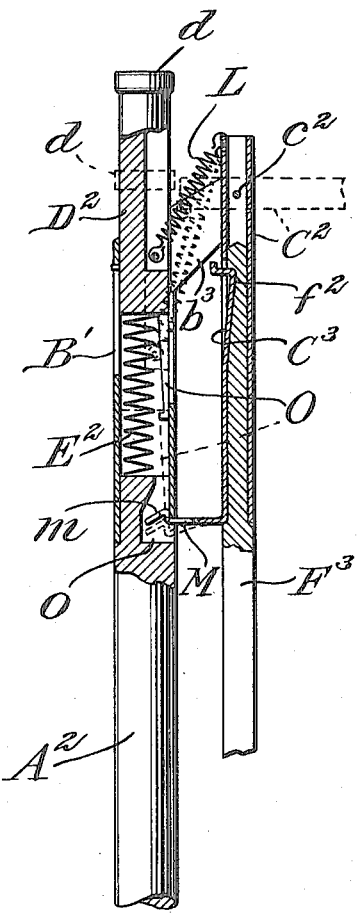
WITNESS
INVENTOR
Marius A. Marcucci
BY
ATTORNEYS United States Patent Office.

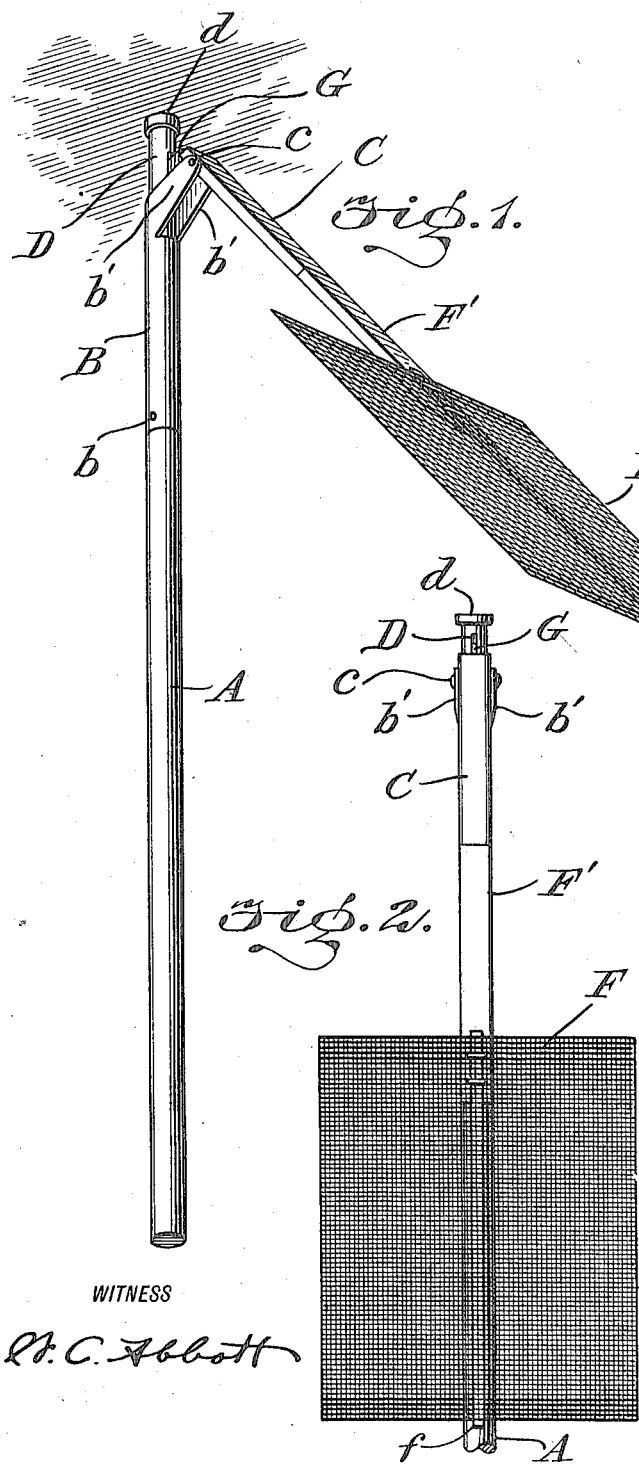

MARIUS A. MARCUCCI, OF NEW YORK, N. Y.

INSECT-BEATER.

1,190,440.  Specification of Letters Patent.  Patented July 11, 1916.

Original application filed January 18, 1916, Serial No. 72,660. Divided and this application filed April 15, 1916. Serial No. 91,277.

*To all whom it may concern:*

Be it known that I, MARIUS A. MARCUCCI, a citizen of the United States, residing at the city of New York, borough of Manhattan, county and State of New York, have invented a certain new and useful Insect-Beater, of which the following is a specification.

This invention is an implement for destroying insects, such as flies, mosquitos, and other forms of insect life.

The object is to provide an implement by the operation of which an insect may be killed on the floor, wall or ceiling of a room. The implement embodies few parts each simple in construction; it is easy of operation and economical of manufacture. The beater element is capable of easy removal in case of injury thereto or should it become worn out, thus enabling it to be replaced at small cost. In a practical form of the invention, it embodies a suitable staff, a beater element mounted for pivotal movement, a spring and an actuating member slidable with respect to the staff, said member being separate from the beater element and coöperating therewith so as to impart a rapid movement thereto. The beater is carried by a pivoted mount and is detachable therefrom so as to be capable of renewal as required, it being preferred to lock the detachable beater to the pivoted mount. The slidable actuator is spring-operated and it is connected operatively with the mount by a link or by a pliable member.

According to one embodiment, the pivoted beater may be operated by means tending to accelerate the movement thereof. Suitable means for this purpose consists of a spring placed under tension by the movement of the slidable actuator until the latter reaches a certain point in its travel, the spring being in the meanwhile placed under tension, whereupon the beater is released and the spring acts suddenly to impart a quick movement to the beater.

Other features and advantages of the invention will appear from the following description taken in connection with the drawings, wherein—

Figure 1 is a perspective view of an insect destroyer embodying this invention. Fig. 2 is a front elevation thereof. Fig. 3 is a vertical section through the device shown in Figs. 1 and 2. Fig. 4 is an enlarged detail section illustrating a loose connection between the slidable actuating member and the pivoted mount. Fig. 5 is a section, partly in elevation, through another embodiment of the invention. Fig. 6 is a cross section through the device of Fig. 5 on the line 6—6. Fig. 7 is an enlarged sectional elevation of a preferred form.

A designates a staff of any suitable length and of any suitable cross sectional dimensions. One end of the staff is reduced to provide a shoulder $a$, and on this reduced end is fitted a metallic thimble B, the latter being secured firmly in position by a cross-pin $b$. The thimble is provided at one end with parallel ears $b'$, between which is fitted a mount C, the latter being pivoted to the ears by means of a pin $c$, whereby the mount C is capable of pivotal movement relatively to the staff.

D designates an actuating member slidably fitted within the thimble B, so that an end portion of the member D passes through the space between the ears $b'$. This actuating member is provided at its outer end with a cushion or pad $d$ composed of any suitable soft material, such as rubber. The member D is free to slide or reciprocate within the thimble and relatively to the staff, but the movement of the staff with respect to the slide operates to compress a spring E, the latter being of the coiled variety and housed or incased within the thimble so that one end of the spring is in contact with the staff, whereas the other end of the spring is seated against the inner incased end of the slide D.

F is a beater constructed in any suitable way or composed of any desired material. As shown, the beater consists of a layer of wire fabric attached to a longitudinal spring $f$. The beater is provided with an arm $F'$ adapted to be thrust into the pivoted mount C and to have locking engagement therewith, whereby the beater is adapted for pivotal movement with the mount, and said beater may, when desired, be disconnected from the mount in order that a worn beater may be replaced by a fresh beater. Any suitable means are provided for locking the beater to the pivoted mount; as shown in Fig. 3 the shank $F'$ is provided with a notch $f'$, and the pivoted mount C is provided with a spring latch $C'$, the latter being adapted to snap into the notch $f'$ of the beater shank for the purpose of locking said beater detachably to the pivoted mount.

The pivoted mount and the slidable actuating member are connected operatively by any suitable means. As shown, a link G is pivoted by a pin $g$ to the slide D, the other end of said link G having a loose or pivotal connection with the mount C, preferably by the means shown in Fig. 4. Said link is shown as having an eye $g'$ which is split or divided as at $g^2$, whereas the pivoted mount is slotted as at $g^3$ so as to produce a connecting member $g^4$. The eye-formed end $g'$ of the link is thrust into the slot $g^3$ of the pivoted mount C, so that the connecting member $g^4$ will pass through the division $g^2$ of the eye, whereby the member $g^4$ fits loosely in the eye $g'$, and thus the link G is detachably and loosely connected with the pivoted member C.

The spring E impels the slide to a projected position, and said slide acts on the link G to turn the mount C into a position parallel to the staff, whereby the beater element F is retained normally in contact with or in close relation to said staff. When it is desired to use the implement, it is placed in position near an insect so that the foot $d$ will be in contact with the surface of a wall, floor, or ceiling, the implement being shown in Fig. 1 in position for its foot $d$ to rest against the ceiling of a room. The operator applies pressure to the staff A and thus slides the staff and the spindle with respect to the actuating member D, which movement of the staff is communicated by the link G to the pivoted mount C, so that the beater F is given a pivotal movement by pressure upon the staff. The operator thrusts sharply upon the staff so as to impart a quick pivotal movement to the beater, and this beater acts to kill the insect. It is apparent that the beater may be of such length as to permit the implement to be placed in position without disturbing the insect on the floor, wall, or ceiling, and after the instrument shall have been positioned within the range of the insect, it is only necessary for the operator to apply pressure to the staff in order to impart the pivotal movement to the beater.

The implement shown in Figs. 5 and 6 is identical with a similar instrument disclosed in a prior application filed by me on Jan. 18, 1916, Serial No. 72,660, and to this extent the present application is a division of my prior application in so far as matters common to the two applications are concerned.

The staff A' is angular in cross section, and at one end said staff is provided with a slot $h$. Attached to the slotted end of the staff is a thimble H which is provided with integral ears $h'$. The actuating member D' is a slide provided at one end with a foot $d'$ composed of rubber or other soft material.

The beater F$^2$ is provided with a shank I, an end portion of which is enlarged to form a cam $i$, said cam-formed end of the beater being positioned between the ears $h'$ of the thimble H whereby the beater is connected pivotally with said thimble, a pin $i'$ passing through the beater shank I and the ears of said thimble. The pivoted beater and the slidable actuating member are operatively connected, a flexible strap band or cord J being employed for this purpose. This band or flexible connection passes around the cam-formed end $i$ of the beater shank, one end of said strap being attached to the beater shank, and the other end being secured to the actuating slide, as shown. The slide is in contact with one face of the staff A' and is guided in its movement by the thimble H. The slide is projected and the beater is drawn inwardly by a coiled spring K, one end being attached to the beater, and the other end being connected with the member D', as shown more clearly in Fig. 5. The operation of the device shown in Figs. 5 and 6 is similar to the device of Figs. 1 to 4 inclusive, as heretofore described.

A preferred form of the invention is illustrated in Fig. 7 of the drawings, wherein A$^2$ designates a staff which is provided at one end with a thimble B', within which operates a slidable actuating member D$^2$ which is normally retained in a projected position by a coiled spring E$^2$. The fixed thimble B' is provided with ears $b^3$ within which is fitted a pivoted mount C$^2$, the latter being connected with the ears by a pivot pin $c^2$. The mount is provided with a latch C$^3$ adapted for locking engagement with a shoulder formed by a notch $f^2$ in the shank F$^3$ of the beater, said shank carrying a beater of any suitable form, whereby the shank may be thrust into the pivoted mount so as to be locked thereto by the latch C$^3$, or said latch may be withdrawn and the beater removed from the pivoted mount.

In addition to the spring E$^2$, the implement of Fig. 7 is provided with a second spring L, the function of which is to accelerate the pivotal movement of the mount and the beater. One end of the spring is attached to the slide D$^2$, whereas the other end of said spring is attached to the mount C$^2$, the pivotal point $c^2$ being intermediate the attachment of the spring L and the beater. The pivoted mount is provided with a latch M having a shoulder $m$, said latch being adapted to extend into a slot $o$ of the fixed thimble B' on the staff A$^2$. The beater is moved into close relation to the staff by the pressure of the spring E$^2$ against the slide D$^2$, so that the latch M will have locking engagement with the slotted part $o$ of the fixed thimble B'. The actuating member D$^2$ is shown as having a releasing element O in the form of a finger which extends downwardly from the member D² and is adapted on the inward movement of the member D² within the thimble to come into contact with the end portion *m* of the latch M.

When the device is operated, the implement is positioned for the foot *d* of the member D² to rest against the ceiling, floor or wall and pressure is applied to the staff A², thus sliding the staff and the spindle relatively to the member D². This sliding movement of the thimble along the member D² carries the pivot pin *c²* of the mount C² in a direction to increase the tension of the spring L, but as the beater F³ is locked by the latch M to the thimble, no pivotal movement of the beater is possible until the releasing finger O contacts with the end *m* of the latch, by which time the spring L is placed under the desired tension. Now when the latch is disengaged by the releasing finger the increased tension of the spring L imparts a quick or accelerated movement to the pivoted beater, and thus the implement may be operated to destroy the insect without giving it a chance to escape beyond the range of the destroyer.

Having thus fully described the invention, what I claim as new, and desire to secure by Letters Patent is:

1. In an insect destroyer, a staff, a pivoted beater, an actuating member separate from the staff and the beater and movable relatively to said staff, and a spring placed under tension by the relative movement of said actuating member.

2. In an insect destroyer, a staff, a pivoted beater, an actuating member separate from the staff and the beater and slidable relatively to said staff, and a spring placed under tension by the slidable movement of said actuating member.

3. In an insect destroyer, a staff, a pivoted mount, a beater carried by said mount and removable at will therefrom, an actuating member separate from the staff and the pivoted mount and movable relatively to said staff, and a spring adapted to be placed under tension by said relative movement of the actuating member.

4. In an insect destroyer, a staff, a pivoted mount, a beater carried by said mount and removable at will therefrom, an actuating member separate from the staff and the pivoted mount and slidable relatively to said staff, and a spring adapted to be placed under tension by said slidable movement of the actuating member.

5. In an insect destroyer, a staff, a slide movable relatively thereto, a pivoted beater separate from the slide, means connecting the slide and the beater, and a spring adapted to be placed under tension by the movement of the slide.

6. In an insect destroyer, a staff, a slide movable relatively thereto, a pivoted mount separate from the slide, a beater carried by the mount, said beater being removable at will from said mount, means connecting the slide and the mount, and a spring adapted to be placed under tension by the movement of the slide.

7. In an insect destroyer, a staff, a slide movable relatively thereto, a pivoted mount separate from the slide, a beater carried by the mount, said beater being removable at will from said mount, means for locking the beater detachably to the mount, means connecting the slide and the mount, and a spring adapted to be placed under tension by the relative movement of the slide to the staff.

8. In an insect destroyer, a staff, an actuating member movable relatively to the staff, a beater separate from the actuating member, means for supporting the beater for pivotal movement with respect to the staff and the actuating member, means connecting the actuating member with the pivoted beater, and a spring adapted to be placed under tension by the movement of the actuating member with respect to the staff.

9. In an insect destroyer, a staff, a slide movable relatively to the staff, a spring opposing the movement of the slide, a mount separate from the slide, said mount being pivoted on the staff, a beater carried by the mount, and a second spring connecting the pivoted mount with the slide, said second spring being placed under tension by the movement of the slide with respect to the staff.

10. In an insect destroyer, a staff, a slide movable relatively to the staff, a spring opposing the movement of the slide, a mount separate from the slide, said mount being pivoted on the staff, a beater carried by the mount, means for locking the beater against pivotal movement, a spring connecting the slide and the pivoted mount, said spring being placed under tension by the movement of the slide with respect to the staff, and means operable by the movement of the slide for releasing said locking means.

11. In an insect destroyer, a staff, a slide thereon, a pivoted beater, means for locking the beater against pivotal movement, a spring adapted to be placed under tension by the movement of the slide, and means for releasing the locking means when the slide reaches a certain point in its movement, said spring operating to impart a quick pivotal movement to the beater.

12. In an insect destroyer, a staff, an actuating member movable relatively thereto, a pivoted beater separate from the actuating member, and means whereby the pivotal movement of the beater is accelerated as compared with the speed of the slide to the staff.

13. In an insect destroyer, a staff, a slide movable relatively thereto, said slide being provided with a foot of soft material, a pivoted beater separate from the slide, and means whereby the movement of the slide operates to impart pivotal movement to the beater.

14. In an insect destroyer, a staff, a slide movable relatively thereto, a spring opposing the movement of the slide and coöperating with the staff so that pressure upon the staff moves it with respect to the slide, a pivoted beater separate from the slide, and means whereby pivotal movement is imparted to the beater.

In testimony whereof I have signed my name hereto.

MARIUS A. MARCUCCI.

Copies of this patent may be obtained for five cents each, by addressing the "Commissioner of Patents, Washington, D. C."